United States Patent [19]

Saccomanno

[11] Patent Number: 4,690,521

[45] Date of Patent: Sep. 1, 1987

[54] MICROSCOPE SLIDE MARKING DEVICE AND METHOD

[76] Inventor: Geno Saccomanno, 778 26½ Rd., Grand Junction, Colo. 81501

[21] Appl. No.: 821,953

[22] Filed: Jan. 24, 1986

[51] Int. Cl.$^4$ .................. G02B 7/02; G02B 15/02; B23B 49/02; G01B 5/14

[52] U.S. Cl. .................................. 350/520; 33/666

[58] Field of Search .............. 33/189, 191, 192, 34, 33/32.5; 350/507, 520

[56] References Cited

U.S. PATENT DOCUMENTS

| | | | |
|---|---|---|---|
| 1,129,742 | 2/1915 | Sheaff | 350/507 |
| 4,262,426 | 4/1981 | Miyazaki | 33/189 |

*Primary Examiner*—John K. Corbin
*Assistant Examiner*—Vincent J. Lemmo

[57] ABSTRACT

A device and method are disclosed for making reference marks on a microscope slide. The device includes a member for mounting the device to a microscope. A marking nib is provided to selectively place a reference mark on the slide at a preselected position relative to an object of interest on the slide. A mechanism is further provided for maintaining the same preselected position relative to all objects of interest marked on a slide including a member for moving the nib in at least two generally orthogonally aligned directions within a horizontal plane to permit adjustment and calibration of the preselected position relative to the objects of interest. A plunger member activates the nib and selectively reference marks the slide. Finally, the device includes a mechanism for selectively varying the size of the mark and for automatically maintaining the size once selected.

31 Claims, 3 Drawing Figures

MICROSCOPE SLIDE MARKING DEVICE AND METHOD

BACKGROUND OF THE INVENTION

1. Field of the Invention

The present invention relates to microscopy systems for scanning and marking microscope slides and, more particularly, to systems for reference marking objects of interest during the scanning of microscope slides. Specifically, the present invention relates to a simple yet effective and accurate system for reference marking objects of interest on a microscope slide without requiring sophisticated and expensive reference marking and relocation equipment and techniques.

2. Description of the Prior Art

During scientific research and inspection work involving microscopic examination of various substances such as tissue cultures, blood cells and the like, a microscope slide is initially scanned at a lower power of magnification. The slide is scanned for the purpose of noting specific objects of interest requiring further study under greater powers of magnification. When such objects of interest are located, it is beneficial to be able to reference mark these objects on the slide for further detailed study after the slide has been fully scanned. Such reference marking greatly reduces the amount of time involved in relocating the specific detail at any given time in the future.

The reference marking of microscopic slides has been used in general for quite some time. For many years, and to some extent even today, objects of interest on microscope slides are reference marked by hand methods, which are time consuming and inaccurate. It is highly desirable to place a reference mark on a slide relative to any given object of interest on such slide in the same relative position compared to other similarly marked objects of interest on the same slide. By having the identical reference mark position relative to an object of interest, a researcher can readily return to an object of interest after locating the reference mark. Prior art hand techniques and their inherent inconsistency makes such ready return to an object of interest more difficult and time consuming once the reference mark has been located.

A significant advance in the microscope slide reference marking art involves automated microscopy systems and methods. Generally with such automatic analysis systems, a microscope slide is initially scanned, and an image of the slide substance configuration is generated by a computer. This image is then processed to determine, or extract, various features of the scanned slide. Based on these identified features, the slide material is classified by the system. Records of identified objects of interest are stored in a computer memory so that they may be subsequently relocated for further visual analysis based on computer memorization of the slide location of the object of interest. Such systems obviously require very sophisticated and expensive electronic and computer equipment first to mark the slide by electronic means and then to relocate any desired object of interest. While such computerized systems are extremely effective and accurate, they are also extremely expensive to own and operate. Oftentimes, the scientific researcher cannot afford such expensive equipment which lends itself to large laboratory analysis schemes such as biological objects, i.e., blood cells. Thus, the standard hand marking techniques have continued to be utilized on a frequent basis.

The present invention, however, allows the scientific researcher to be able to view and scan the entire microscope slide and specimen detail to find specific unique or abnormal details thereon. When such unique details or objects of interests have been identified, the present invention permits a microscopist to continue his or her scanning while simultaneously, accurately and quickly reference marking the object of interest in a consistent and accurate manner without the need of sophisticated and expensive equipment.

SUMMARY OF THE INVENTION

Accordingly, it is one object of the present invention to provide an improved microscope slide marking device and method.

It is another object of the present invention to provide a novel device and system for reference marking microscope slides while details are simultaneously being observed within the field of view of the microscope.

It is another object of the present invention to provide a device and method for marking microscope slides and objects of interest thereon which is simple, accurate, consistent yet cost effective and inexpensive.

Accordingly, to achieve the foregoing and other objects and in accordance with the purposes of the present invention, as embodied and described herein, a device and method are provided for making reference marks on a microscope slide. The device includes a member for mounting the device to a microscope. A marking nib is provided to selectively place a reference mark on the slide at a preselected position relative to an object of interest on the slide. A mechanism is also provided for maintaining the same preselected position relative to all objects of interest marked on a slide and includes a member for moving the nib in at least two generally orthogonally aligned directions within the same horizontal plane to permit adjustment and calibration of the preselected position relative to the objects of interest. A plunger member activates the nib and selectively reference marks the slide. Finally, a mechanism is provided for selectively varying the size of the mark and for automatically maintaining the size once selected.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings in which:

DETAILED DESCRIPTION OF THE PREFERRED EMBODIMENTS

Figure 1:
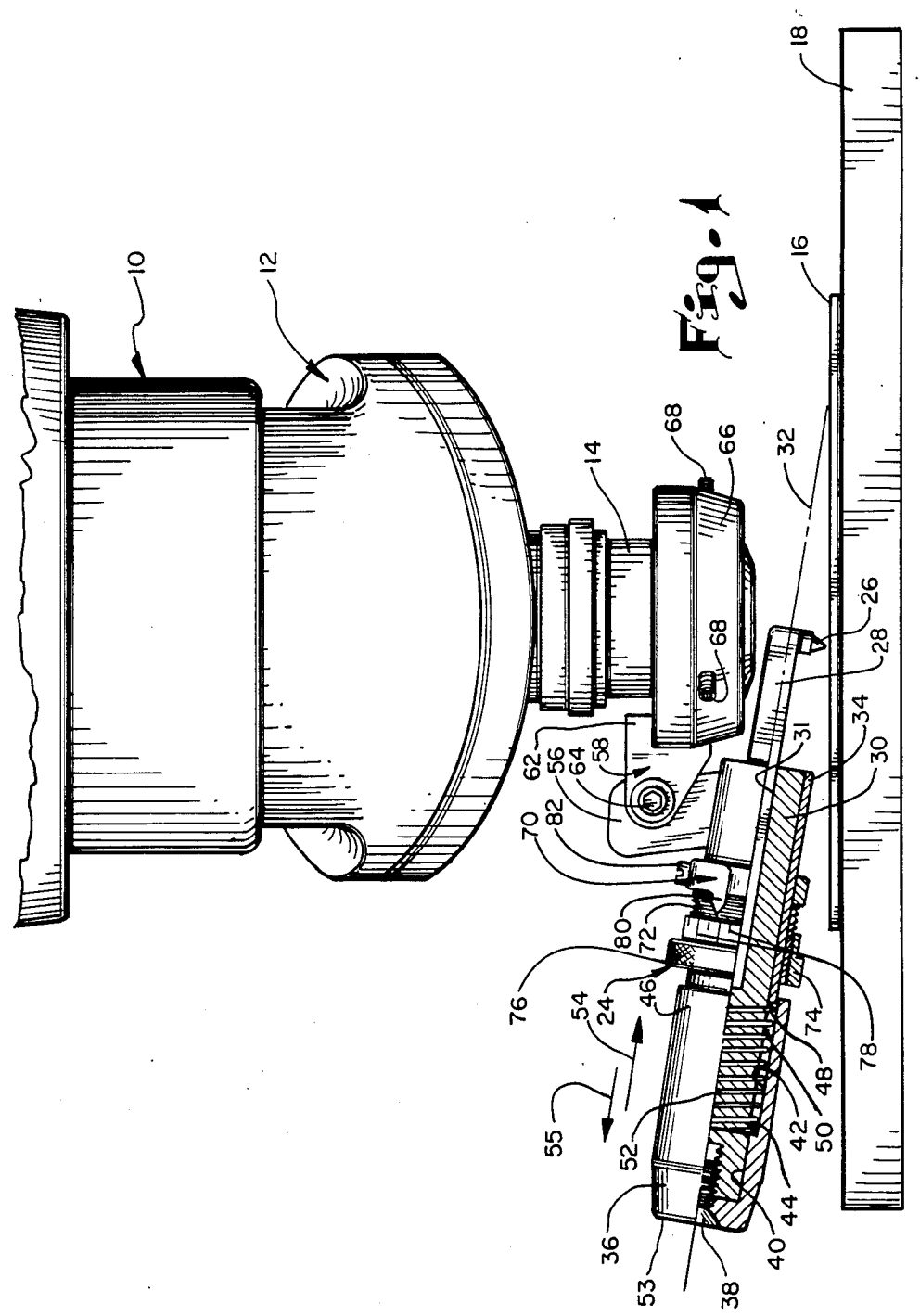
FIG. 1 is a side perspective view, with some parts in section, of a microscopy system incorporating the reference marking device of the present invention.

Referring initially to FIG. 1, a microscope 10 includes a lens turret system 12 which is adapted for carrying a plurality of magnifying lens systems known as lens objectives thereon. Each of these lens objectives, of which only one is illustrated in FIG. 1, is designed to provide differing powers of magnification. In the illustrated embodiment, the objective 14 is known as a scanning objective having a power of magnification sufficient to permit some detailed observation of a microscope slide 16 so as to identify various details and objects of interest thereon yet not so powerful as to provide detailed study of such objects. In this manner, a microscope slide 16 may be scanned back and forth to determine and locate various objects of interest which can then be relocated for detailed study under greater magnification after complete scanning of the slide 16, by turning of the lens turret 12 to a different, more powerful objective.

Typically, the microscope slide 16 is mounted to a microscope stage 18 which is capable of being moved in two orthogonally aligned directions 20, 22 (see FIG. 2) in the horizontal plane. In this manner, the microscope slide 16 may be scanned from side to side along directions 20 and forward and back along directions 22. As an object of interest is located within the viewing area of the slide 16, the device 24 is activated to leave a visible reference mark on the slide 16 at a predetermined location relative to the object of interest. When such a reference mark is made, the user of the microscope 10 may continue scanning the slide 16 for other objects of interest which are likewise reference marked utilizing the device 24. Once such objects of interest have been located and the slide 16 fully scanned, the scientist may then readily relocate to the objects of interest for further detailed study at higher magnification. Such objects of interest may be readily identified and relocated as a result of the visible reference marks made on the slide by the device 24.

Figure 2:
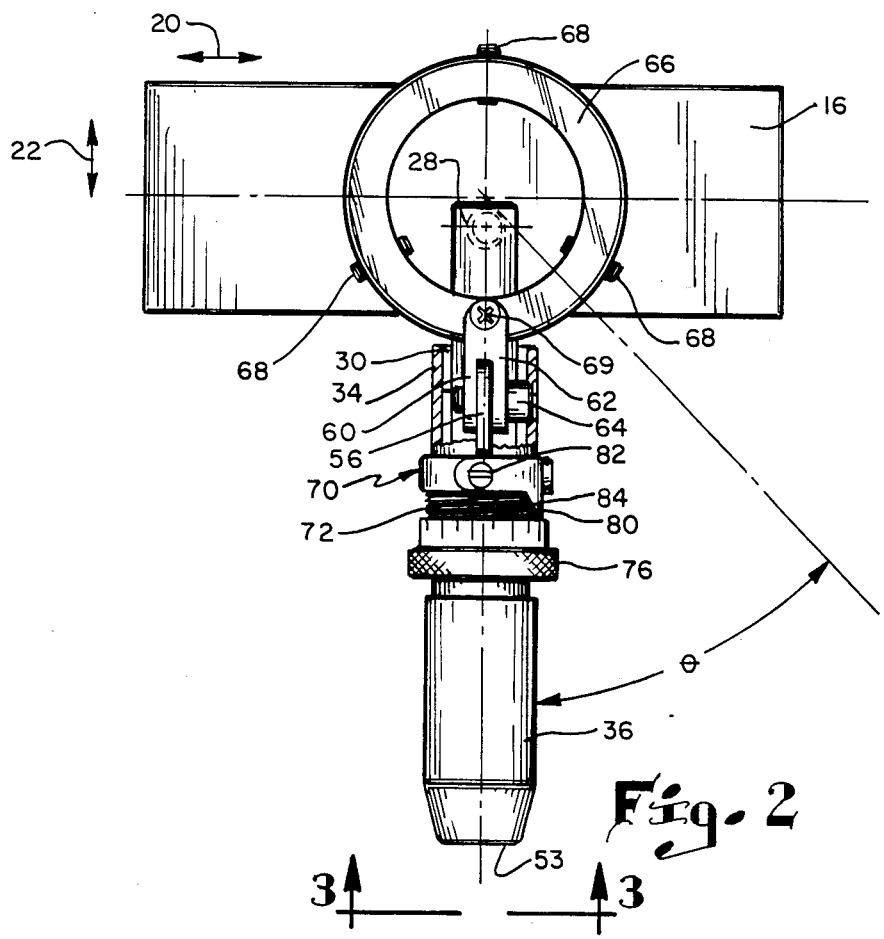
FIG. 2 is a top plan view, with parts in section, of the reference marking device illustrated in FIG. 1.
Figure 3:
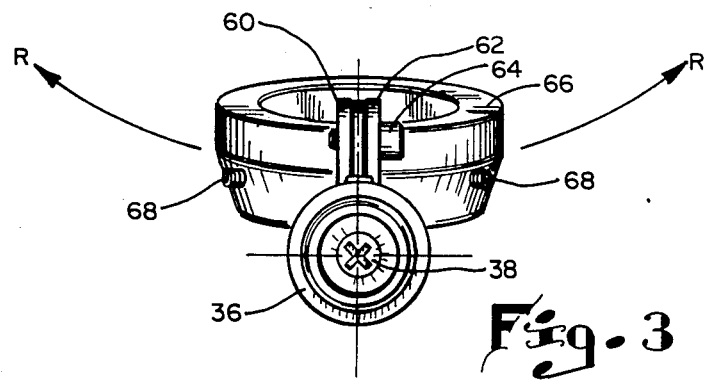
FIG. 3 is a rear perspective view of the device illustrated in FIG. 2 and taken substantially along line 3—3 of FIG. 2.

Referring now to FIGS. 1-3, the preferred marking device 24 includes a marking nib 26 mounted on an arm member 28. The nib 26 is positioned so as to contact the slide 16 and leave a small, visible reference mark when the device 24 is activated. The nib arm 28 preferably carries an ink cartridge capable of supplying liquid ink to the tip of the nib 26. The nib arm 28 is likewise disposed within a central cylinder member 30. While the nib arm 28 may be mounted within the cylinder 30 in any desired fashion, it is preferably press fit within an opening 31 in the cylinder 30. In this manner, when the ink is depleted from the ink cartridge, the arm 28 is merely removed from the cylinder 30 and replaced with a similar arm 28 having a nib 26 and filled with an appropriate supply of ink.

Disposed about the forward end of the central cylinder 30 is a plunger barrel or tube 34. The tube 34 is sized and shaped so as to permit the cylinder 30 to move axially therewithin along the axis 32 and as further described below. Disposed about the rearward portion of the cylinder 30 is a plunger sleeve 36. The plunger sleeve 36 is firmly secured to the rear of the cylinder 30 by a screw member 38 or other similar attachment arrangement so as to move axially in conjunction with the cylinder 30.

The plunger sleeve 36 is in the form of a hollow cylinder having two stepped interior surfaces. The first inner cylindrical surface 40 is disposed toward the rearward end of the sleeve 36 and is sized to snugly receive the cylinder 30. The second inner surface 42 is positioned toward the forward end of the sleeve 36, and has a diameter greater than the inner surface 40 so as to be spaced from the cylinder 30. In this manner, the juncture between the surfaces 40 and 42 creates an interior lip 44, the purpose of which will be described in detail below. The forward portion 46 of the plunger sleeve 36 overlaps the rear portion of the tube or barrel 34 so as to create another inner lip 48 spaced opposite from the lip 44. As a result of the surface 42 having a diameter greater than the inner surface 40, a gap 50 is created between the outer surface of the cylinder 30 and the inner surface 42 of the plunger sleeve 36.

A coiled return spring member 52 is disposed about the central portion of the cylinder 30 within the gap 50 and is sized and shaped so as to abut the opposing lips 44 and 48. The spring 52 is sized and shaped so that the plunger sleeve 36 maintains the position illustrated in FIG. 1 as its normal, unactivated condition. When it is desired to place a reference mark on the slide 16, the rear surface 53 of the plunger sleeve 36 is manually pushed forwardly along the direction indicated by the arrow 54 until the nib 26 contacts the slide 16 thereby leaving a reference mark thereon. As soon as pressure is removed from the surface 53, the return spring 52 forces the plunger sleeve back along the direction indicated by the arrow 55 so as to return the device 24 to its normal, unactivated condition as illustrated in FIG. 1.

In order for the above operation of device 24 to take place, it is imperative that the plunger tube or barrel 34 remain stationary relative to the axial movement of the plunger sleeve 36, the cylinder 30, the nib arm 28 and the nib 26. To achieve this as well as to permit adjustment and calibration of the position of the nib 26, the tubular barrel 34 is firmly secured to the objective 14 in a manner described below.

In preferred form, a locking fin or pivot arm 56 extends upwardly from the plunger tube 34. A clevis member 58 is provided having spaced apart arms 60, 62 between which the fin 56 is sandwiched. The fin 56 and each of the clevis arms 60, 62 include aligned apertures adapted to receive a locking-type pivot pin 64 therethrough. In this manner, the device 24 may be rotated within a vertical plane relative to the clevis member 58 and locked in place by the locking pivot pin 64.

The clevis member 58 is likewise secured to an annular member 66 which is preferably in the form of a ring sized and shaped to fit about the circular objective 14. The annular member 66 is preferably secured in place about the objective 14 by a plurality of screws or other similar attachment members 68. In preferred form, the screws 68 are spaced equidistantly about the perimeter of the annular member 66 to provide firm attachment to the objective 14. As can be seen, the entire device 24, may be moved through the angle $\phi$ (FIG. 2) by adjustment of the screws 68 and rotation of the annular member 66 to any desired position relative to the objective 14. Once the desired position relative to the objective 14 is achieved, the screws 68 are tightened against the objective 14 to firmly secure the device 24 in place.

In the preferred embodiment and as particularly illustrated in FIG. 2, the clevis member 58, is secured to the annular ring 66 by a screw-type pivot pin 69. This arrangement permits rotation of the device 24 and the nib 26 through angle R relative to the fixed position of the annular ring 66. Thus, the movement of the nib 26 within the horizontal plane can be achieved either by rotation about the pivot pin 69 or by rotation of the entire annular ring 66 about the objective 14.

In this manner, once the position of the clevis member 58 relative to the annular member 66 is determined, it may be fixed by securely attaching the pin 69. This permits positioning of the tubular barrel 34 and the nib 26 within the horizontal plane to any desired position relative to the annular member 66 and the slide 16.

As indicated above, the annular member 66 is preferably in the form of a ring sized and shaped to fit around the objective 14. The plurality of adjustment screws 68 are spaced equationally thereabout so as to firmly secure the ring 66 to the objective 14 without requiring undue pressure. The ring 66 and mounting screws 68 are adapted to permit positioning of the device 24 anywhere along the circumferential edge of the objective 14, thereby providing a full 360 degree position capability of the device 24 relative to the objective 14 of the microscope 10. The positioning of the device 24 in such a manner by adjustment of the screws 68 will be dependent upon the personal preferences of the user of the device 24 and microscope 10 as described below. Once the overall position of the device 24 has been determined, the screws 68 are tightened so as to lock the device 24 in place. Subsequently, the vertical and horizontal positions of the nib 26 can then be adjusted readily by adjusting the pivot pin 69 and the pivot pin 64, thereby permitting adjustment of the plunger tube 34 and the nib 26 within the horizontal and vertical planes relative to the slide 16.

In order to calibrate the device 24 as well as to adjust the size of the reference mark left by the nib 26, a micro-calibrator 70 is provided. In preferred form, the microcalibrator 70 fits over the outside diameter of the plunger tube 34 and is longitudinally located on the tube 34 forward of the sleeve 36. The micro-calibrator 70 includes a male micrometer thread portion 72 mounted to the outer surface of the tube 34. A corresponding female thread portion 74 is provided for engagement with the male thread portion 72. An annular dial member 76 extends outwardly beyond the female portion 74 so as to permit adjustment of the female portion 74 longitudinally along the male thread 72. The female micrometer portion 74 includes a plurality of graduation markings 78 thereon to permit visual adjustment of the microcalibrator 70. Finally, a reference pointer 80 is provided for indicating the appropriate graduation markings 78.

A key screw 82 locks the calibrator assembly 70 to the cylinder 30 and interacts with a longitudinally aligned key slot 84 disposed within the tube 34 so as to secure and retain the micro-calibrator 70 in place. The key screw 80 and the key slot 82 allow the cylinder 30 to be adjustably moved longitudinally within the tube 34 providing limits to longitudinal movement of the nib 26 in response to activation of the plunger sleeve 36. By rotation of the dial 74, the longitudinal movement available to the cylinder 30 and thus the nib 26 can be readily adjusted. Consequently, the greater the movement provided the nib 26, the larger the mark left on the slide 16. Therefore, the size of the reference mark left on the slide 16 may be adjusted through the use of the microcalibrator 70.

To install the device 24, the annular member 66 is first slipped over the objective 14 and firmly clamped into place by the three attachment members 68 once the desired circumferential position is achieved. Once the device 24 is so mounted and the microscope focused onto the slide 16, the plunger sleeve 36 is moved longitudinally in the direction indicated by the arrow 54 while closely observing the nib 26. The nib 26 is adjusted by the dial 76 so as to adjust its touch to the slide 16 enough to leave an initial mark. Adjustment of the pivot pins 64 and 69 allow adjustment of the nib 26 within the vertical and horizontal planes so as to position the nib 26 at any desired location within the field of view of the user of the microscope 10 but offset from the direct center of the field of view. Once the desired position is so achieved, it is left in place. Likewise, the size of the reference character can be adjusted in accordance with the desires of the user of the device 24 by appropriate adjustment of the micro-calibrator 70. Once these adjustments and calibrations are made, the device is left in place so as to make reference marks upon activation of the device 24 in the exact same relative position to all objects of interest throughout the entire slide 16.

As a result of the above invention, the microscopist using the device 10 can focus the specimen detail and scan the slide 16. When a specific detail or object of interest is located by the microscopist, its location can be immediately reference marked by depressing the plunger sleeve 36. Quick, deliberate marks can be made without having to take the eyes from the field of view. The microscopist can size the reference marks to his or her particular preference by simply adjusting the dial 76. Once the entire slide 16 has been scanned, the microscopist can easily and quickly return to any desired object of interest for detailed study due to the accuracy, precision and rigidity of the device 24 and the reference mark left thereby. Moreover, at any time during the course of scanning the slide 16, a microscopist may desire to view a specific object of interest in greater detail under higher magnification. In this instance, the lens turret 12 is turned so as to use an objective having a greater power of magnification. In this case, the device 24 remains secured in its relative position to the scanning objective 14. After viewing the slide 16 under higher magnification, the turret 12 can be returned to the scanning marking objective 14 with its attached device 24 without loosing the relative calibration due to the fixed position of the device 24 relative to the objective 14.

Finally, when the ink supply in the pen cartridge 28 is exhausted, it is readily and quickly changed by simply removing the cartridge 28 and replacing it with a new one. In the meantime, the remainder of the device 24 is retained in the same relative position to the objective 14. In this manner, the ink supply can be changed in the device 24 even in the middle of scanning a particular slide 16 without changing the relative positioning of the device 24 and the resultant reference marks left thereby on the slide 16. The scanning marking operations can then be resumed.

As can be seen from the above, the present invention provides a simple yet effective and accurate method and device for reference marking microscope slides and objects of interest located thereon. The device is easy to install, calibrate and utilize, yet is inherently accurate over prolonged use and does not require expensive equipment either to operate or to read the reference marks left thereby. Thus, the present invention retains the inheritant advantages of prior hand marking techniques by leaving readily visible marks on the slide which can be easily seen by a microscopist. However, it eliminates the difficulties and disadvantages of prior hand techniques in that the reference characters are uniform in size and placement relative to all objects of interest on a single slide due to the inheritant accuracy of the device of the present invention. Hence, the present invention is inexpensive, easy to use and provides an accurate and reliable technique for reference marking microscope slides.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A device for making reference marks on a microscope slide comprising:
   means for mounting said device to a microscope;
   a marking nib adapted to selectively place a reference mark on said slide at a preselected position relative to an object of interest on said slide;
   means for maintaining said preselected position relative to all objects of interest marked on a slide including means for moving said nib in at least two generally orthogonally aligned directions within a horizontal plane to permit adjustment and calibration of said preselected position relative to said objects of interest;
   plunger means for activating said nib and selectively reference marking said slide; and
   means for selectively varying the size of said mark and for automatically maintaining said size once selected.

2. The device as claimed in claim 1, wherein said mounting means is adapted to mount said device to the magnifying objective of a microscope and to selectively vary its position about the circumference thereof.

3. The device as claimed in claim 2, wherein said mounting means comprises a circular mounting member circumferentially adjustable about said objective to selectively vary the radial position of said device relative thereto, said mounting member being pivotally secured to said device to permit selective movement of said device in a vertical plane relative to said objective.

4. The device as claimed in claim 1, wherein said plunger means includes a tubular member adapted to move said nib longitudinally relative thereto to contact and reference mark said slide.

5. The device as claimed in claim 4, wherein said plunger means comprises a tubular plunger cylinder adapted to move said nib from a stationary position along the longitudinal axis thereof outwardly to contact said slide, and return spring means adapted to return said nib to its stationary position.

6. The device as claimed in claim 5, wherein said size varying means comprises a micro-calibrator arrangement adapted to adjust the longitudinal travel of said nib relative to said plunger cylinder to vary the amount of contact of said nib with said slide to thereby adjust the size of said mark.

7. The device as claimed in claim 6, wherein said device further includes an ink cartridge secured for feeding ink to said nib and mounted within said plunger cylinder for longitudinal movement therewithin, the travel distance of said cartridge and nib being adjustable by said micro-calibrator arrangement.

8. The device as claimed in claim 1, wherein said position maintaining means includes said nib moving means, means for adjusting the circumferential position of said device and nib relative to said microscope, and means for pivotally moving said nib in a vertical plane relative to said microscope.

9. The marking device as claimed in claim 8, wherein said mounting means is adapted to mount said device to a magnifying objective of a microscope and includes said adjustment means to selectively vary the circumferential position of said device relative to said objective.

10. The device as claimed in claim 9, wherein said mounting means comprises an annular member adapted to mount about said objective to selectively vary the circumferential position of said device relative to said objective, and a pivot arm arrangement secured to said annular member to provide pivotal movement of said device and nib in a vertical plane.

11. The device as claimed in claim 10, wherein said nib moving means comprises a pivot pin interconnecting said pivot arm arrangement to said annular member to permit the movement of said device and nib in a horizontal plane independent of said pivotal movement in the vertical plane.

12. A reference marking device for identifying objects of interest on a microscope slide while said slide is being scanned for such objects of interest, said device comprising:
    a marking nib adapted to selectively place a reference mark on said slide at a variable preselected position relative to an object of interest located on said slide;
    plunger means for carrying and manually activating said nib to selectively mark said slide; and
    a mounting member adapted to mount said plunger means to the magnifying objective of a microscope, said mounting member including a pivot arm arrangement mounted to said magnifying objective and pivotably mounted to said plunger means to permit variable selective movement of said plunger means and nib in a vertical plane relative to said slide, means for permitting mounting of said plunger means at any predetermined radial position about said microscope objective, and means for adjustably and selectively varying the horizontal position of said nib relative to said microscope objective thereby selectively positioning said nib within the horizontal plane at a preselected position relative to all objects of interest located on said slide.

13. The marking device as claimed in claim 12, wherein said plunger means comprises a plunger tube member, a nib arm mounted within said plunger tube and carrying said nib at the distal end thereof, and a plunger sleeve adapted to move said nib to place said mark on said slide.

14. The marking device as claimed in claim 13, wherein said plunger means further comprises a central cylinder positioned for axial movement within said plunger tube and adapted to carry said nib arm.

15. The marking device as claimed in claim 14, wherein said plunger means further includes return spring means dosposed within said plunger sleeve and adapted for maintaining said nib in a stationary position spaced from said slide and for returning said nib to said stationary position after movement of said plunger sleeve to selectively mark said slide with said nib.

16. The marking device as claimed in claim 14, further comprising a micro-calibrator mounted about said ·plunger tube for adjusting the axial position and longitudinal movement of said central cylinder within said plunger tube to adjust and calibrate the position and movement of said nib relative to said slide, thereby varying the size of said mark.

17. The marking device as claimed in claim 12, wherein said mounting member further includes an annular member disposed about said microscope objective and adapted for selective positioning about the entire circumference of said objective.

18. The marking device as claimed in claim 17, wherein said pivot arm arrangement is further secured to said annular member by a second pivot pin to permit movement of said plunger means and nib in said horizontal plane, whereby said nib can be prepositioned in the vertical and horizontal plane relative to said slide so that reference marks may be made on said slide in the same relative position to all objects of interest located on the same slide.

19. The marking device as claimed in claim 18, further comprising a micrometer secured to said plunger means to permit adjustment of the travel length of said nib when activated by said plunger means.

20. A microscopy system for locating and reference marking objects of interest within a viewing area on a microscope slide having one or more of said objects of interest thereon, said system comprising:
a microscope adapted to permit magnified viewing of said objects of interest within said viewing area on a slide;
detection means for permitting the scanning of said slide and visual detection of said objects of interest within said viewing area including at least one microscope magnifying objective;
means for selectively placing a reference mark on said slide at a preselected, variable position relative to each said object of interest, the relative position of said reference mark being the same for all objects of interest on a given slide to permit easy reference and identification of said objects of interest for deteiled study after completion of said microscope slide scanning, said reference mark placing means including a marking nib and means for adjusting the relative position of said nib in the horizontal and vertical planes relative to the viewing area of said slide; and
means for selectively varying the size of said mark and for automatically maintaining said size once selected.

21. The microscopy system as claimed in claim 20, wherein said reference mark placement means includes plunger means for carrying and manually activating said nib to selectively mark said slide.

22. The microscopy system as claimed in claim 21, wherein said plunger means comprises a plunger tube cylinder, a nib arm carrying said nib at the distal end thereof, a central cylinder member disposed for axial movement within said plunger tube cylinder and carrying said nib arm, and a plunger sleeve adapted to move said central cylinder and said nib in an axial direction relative to said plunger tube cylinder.

23. The microscopy system as claimed in claim 20, wherein said relative position adjustment means comprises an annular member disposed about said microscope objective and adapted for movement about the circumference thereof to adjust the position of said nib in said horizontal plane, means for carrying said nib, and a pivot arm assembly mounted to said annular member and pivotably mounted to said nib carrying means to permit movement of said nib in a vertical plane.

24. The microscopy system as claimed in claim 23, wherein said relative position adjustment means further includes a second pivot member adapted to permit movement of said nib carrying means in a horizontal plane relative to said annular member.

25. A method for reference marking objects of interest on a microscope slide during the scanning thereof in order to permit easy identification and return to said objects of interest for detailed study after completion of said microscope slide scanning, said method comprising the steps of:
mounting a marking nib and cartridge to the scanning objective of a microscope for movement to provide a reference mark on said slide when activated;
adjusting the position of said nib in a horizontal plane to provide a mark on said slide at a preselected position within the plane of said slide relative to an object of interest appearing thereon;
adjusting the position of said nib in a vertical plane above the slide and adjusting the amount of the longitudinal travel of said nib to provide a preselected size of mark; and
activating said nib each time an object of interest is identified, thereby providing a reference mark of substantially the same size and relative placement for each identified object of interest on said slide.

26. A device for making reference marks on a microscope slide comprising:
means for mounting said device to a microscope having an optical centerline or axis;
a marking nib adapted to selectively place a reference mark on said slide;
a plunger means for activating said nib and selectively reference marking said slide;
positioning means apart from said mounting means adapted to allow said selective placement of the reference mark at a selectively variable position relative to said optical centerline during normal use.

27. A reference marking device as recited in claim 26 wherein said positioning means includes a pivot pin arrangement to permit pivotal movement of said nib for adjusting the radial position of said nib relative to said optical centerline.

28. A reference marking device as recited in claim 27 wherein said positioning means further includes a pivot arm arrangement interconnecting said mounting means and said nib to permit variable selective movement of said nib in a vertical plane relative to said slide.

29. A reference marking device as recited in claim 26 wherein said positioning means includes a pivot means interconnecting said mounting member and said plunger means for permitting selective pivotal movement of said plunger means relative to said mounting member to position said nib.

30. A reference marking device as recited in claim 26 wherein said positioning means is adapted to allow selective placement of the reference mark at a selectively variable distance from said optical centerline.

31. A reference marking device as recited in claim 26 wherein said positioning means is adapted to allow selective placement of the reference mark at a selectively arcuate position around said optical centerline.

* * * * *